United States Patent Office 3,542,841
Patented Nov. 24, 1970

3,542,841
ARYL DERIVATIVES
Donald R. Moore, Rutherford, N.J., and Giuliana C. Tesoro, Dobbs Ferry, N.Y., assignors to J. P. Stevens & Co., Inc., New York, N.Y., a corporation of Delaware
No Drawing. Filed July 6, 1966, Ser. No. 563,064
Int. Cl. C07c 69/00
U.S. Cl. 260—463                                1 Claim

ABSTRACT OF THE DISCLOSURE

This invention concerns novel aliphatic polyaryl carbamates useful as intermediates and as crosslinking agents for polyamines and polyimines.

---

This invention relates to aromatic ester derivatives of polyhydric alcohols, their preparation and to their application as crosslinking agents.

More particularly, this invention relates to polyaryl carbonates useful as intermediates and as crosslinking agents for polyimines and polyamines. The term "poly" as used herein refers to compositions containing at least three (3) aryl carbonate radicals per molecule. The preferred compositions of this invention are included within the formula:

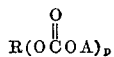

wherein:

R is a substituted or unsubstituted polyvalent residue or an aliphatic polyhydric alcohol which as described infra can contain one or more heteroatoms;
A is an aryl radical from the group consisting of phenyl and alkyl-substituted phenyl radicals, and
p is an integer greater than 2, preferably from 3–6.

Cellulosic fabrics have long been known and are widely employed both in the unblended and blended forms. In the manufacture of clothing the cellulosics are especially advantageous because of their low cost, availability, durability, compatibility with both natural and synthetic fabrics, and their comfort properties.

However, the cellulosics are inherently less resilient than some of the synthetic fibers and less resistant than the synthetics to wrinkling. Furthermore, the cellulosics normally do not exhibit good crease recovery. To overcome these deficiencies of the cellulosics, various chemical treatments have been explored. Among the more successful agents have been polyfunctional reagents which are referred to in the art as crosslinking agents. These compositions have 2 or more reactive sites that can interact with the hydroxyl groups of cellulose and related polymeric materials to form crosslinked macromolecules.

A valuable group of compounds for crosslinking cellulosic textiles are the multifunctional polymethylolated carbamates disclosed and claimed in co-pending application Ser. No. 563,057 filed July 6, 1966. There, the aryl carbonates of this invention are shown to be useful as starting materials for the polymethylolated carbamates.

Cellulose-containing fabrics treated with these polymethylolated carbamate agents are advantageous in several respects. For example, the resilience, dimensional stability and crease resistance of fabrics comprising crosslinked fibers are substantially improved compared to untreated controls. In addition, the crosslinked fabrics retain these characteristics even after repeated launderings.

Heretofore the aforementioned polymethylolated derivatives of such polycarbamates were not available because of the difficulty in preparing the necessary intermediates. For example, attempts to prepare pure products in good yields fail when the methods previously used to prepare monocarbamates are applied to the attempted preparation of polycarbamates. Yields are poor and the products are contaminated with substantial quantities of side products. For these reasons, prior art procedures starting with the triol or higher polyols have been grossly unsatisfactory.

Quite unexpectedly it has been found that when the novel aliphatic polyaryl carbonates are used as starting materials, the reaction with amines or ammonia is rapid and clean cut; under mild reaction conditions, yields are excellent and the product that is obtained is substantially free of contaminants. The success of the above reaction makes the inventive compositions uniquely valuable as intermediates for the preparation of other crosslinking agents.

It is an object of this invention, among many others, to prepare a novel class of polyaryl carbonates.

Yet another object of this invention is the development of novel crosslinking agents for polyimines and polyamines and related polymeric compositions.

Still a further object of this invention is the development of new intermediates for preparing polymethylolated polycarbamates in good yield substantially free from undesirable contaminants.

Still a further object is the development of a clear cut and direct method for replacing the hydroxyl groups of polyols with aryl carbonate radicals.

Additional objects will become apparent to the reader after a perusal of this application.

In practice a polyol reactant having 3 or more hydroxyl groups is contacted with aromatic haloformate in the presence of a combination solvent-acid acceptor until the hydroxyl groups are replaced with aryl carbonate groups. The product is separated by the addition of a solvent miscible with the reaction mixture in which the product is poorly soluble. The product can be further purified by the usual methods employed in the art. A favored embodiment of this invention is shown below:

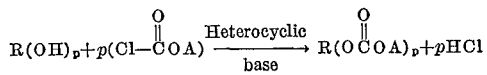

wherein:

R is a substituted or unsubstituted aliphatic radical selected from saturated and unsaturated aliphatic radicals, and
A is phenyl and alkylated phenyl, and
p is an integer greater than 2.

In the favored practice, an aryl chloroformate is added slowly to a stirred reaction mixture of the polyol dissolved in pyridine or a comparable heterocyclic tertiary base maintained at about 10–75° C. After the addition of chloroformate is complete, the stirring is continued for an hour or two. Then water is added to separate out the product.

In the case of solids, precipitation occurs and the product is washed to remove the solvent. The solid product is ordinarily reprecipitated from an aliphatic alcohol such as ethanol, washed and dried.

Liquid products which form an oily layer upon addition of water to the reaction mixture are separated after standing and extracted to remove product. The solvent is stripped off by distillation to yield the final product.

As indicated, supra, the process used to prepare the novel compounds of this invention is relatively flexible regarding reactants that can be employed. For example, the inventive process is applicable to both substituted and unsubstituted aliphatic polyols generally. The aliphatic residue can contain heteroatoms such as nitrogen, sulfur, phosphorous, and oxygen. A useful group of oxygen-containing reactants include the partially and fully alkoxylated polyols formed by condensing alkylene oxides with the polyols. Particularly useful are the ethoxylated and propoxylated polyols illustrated by ethoxylated and propoxylated glycerol and pentaerythritol, among others. Additional starting materials include polyols containing ether, thioether and/or tertiary amine linkages, or where the heteroatoms such as phosphorous, sulfur, nitrogen, and oxygen are part of a heterocyclic structure.

As indicated earlier, the inventive process is applicable to polyols and their derivatives generally. However, products prepared from substituted or unsubstituted polyols containing from 3 to 6 reactive hydroxyl groups are particularly valuable. A representative group of such polyols appears below.

TRIHYDRIC ALCOHOLS, R(OH)$_3$

Glycerol HOCH$_2$—CHOH—CH$_2$OH
1,2,3-butanetriol HOCH$_2$—CHOH—CHOH—CH$_3$
1,2,4-butanetriol HOCH$_2$—CHOH—CH$_2$—CH$_2$OH
1,2,6-hexanetriol HOCH$_2$CHOH(CH$_2$)$_3$CH$_2$OH
2-(hydroxymethyl)-2-methyl-1,3-propanediol
  CH$_3$—C(CH$_2$OH)$_3$
2-ethyl-2-(hydroxymethyl)-1,3-propanediol
  CH$_3$CH$_2$—C(CH$_2$OH)$_3$
2-(hydroxymethyl)-2-propyl-1,3-propanediol
  CH$_3$CH$_2$CH$_2$—C(CH$_2$OH)$_3$
Nitrilotriethanol or triethanolamine N(CH$_2$CH$_2$OH)$_3$
2-(dimethylamino)-2-(hydroxymethyl)-1,3-propanediol (CH$_3$)$_2$NC(CH$_2$OH)$_3$
Pentaerythritol mono(N-methylcarbamate)
  CH$_3$—NH—CO—O—CH$_2$—C(—CH$_3$—OH)$_3$

TETRAHYDRIC ALCOHOLS, R(OH)$_4$ 1,2,3,4-butanetetrols

HOCH$_2$—CHOH—CHOH—CH$_2$OH such as meso-erythritol or i-tetritol
Pentaerythritol C(CH$_2$OH)$_4$
3,3'-oxydi-1,2-propanediol (HOCH$_2$—CHOH—CH$_2$—)$_2$O and other "diglycerols."
Sorbitol monocyclic carbonate, such as

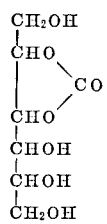

and its position isomers as well as stereoisomers.

In addition, the tetrols such as are described below can be employed as starting materials:

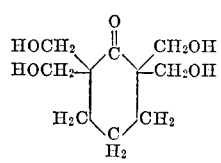

or

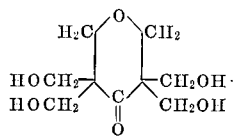

PENTAHYDRIC ALCOHOLS, R(OH)$_5$ 1,2,3,4,5-petanepentols C$_5$H$_{12}$O$_5$; such as adonitol, d-arabitol, and xylitol
"Triglycerols" C$_9$H$_{20}$O$_7$ 4-hydroxy-3,3,5,5-tetrakis(hydroxymethyl)-tetrahydropyran

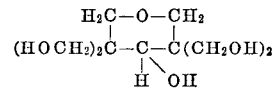

2,2,6,6-tetrakis(hydroxymethyl)-1-cyclohexanol

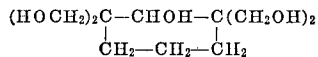

HEXAHYDRIC ALCOHOLS, R(OH)$_6$

"Dipentaerythritol"

(HOCH$_2$)$_3$CCH$_2$—O—CH$_2$C(CH$_2$OH)$_3$

Inositol (CHOH)$_6$ or 1,2,3,4,5,6-cyclohexanehexol
1,2,3,4,5,6,7-heptaneheptols C$_7$H$_{16}$O$_7$; such as perseitol and arabinol, galactitol, glucitol (sorbitol), iditol, mannitol, and ribitol.

HIGHER POLYHYDRIC ALCOHOLS, R(OH)$_7$ AND HIGHER 1,2,3,4,5,6,7-heptaneheptols C$_7$H$_{16}$O$_7$; such as perseitol and volemitol
2,2,4,4-tetrakis(hydroxymethyl)-1,3,5-pentanetriol
  (HOCH$_2$)$_3$C—CHOH—C(CH$_2$OH)$_3$; also called enneaheptitol
"Tripentaerythritol" C$_{15}$H$_{32}$O$_{10}$; a commercial octahydric alcohol.

In addition to the above representative polyhydric alcohols (polyols), the following group of hydroxyl-containing polymers can be employed as starting materials. These "polyols" are represented by the formula

[R(OH)$_n$]$_x$ wherein R(OH)$_n$ represents a repeating unit containing $n$ hydroxyl groups and $x$ represents the degree of polymerization.

Illustrative compounds are polyvinyl alcohol, partially hydrolyzed polyvinyl acetate, and hydrolyzed copolymers of ethylene and vinyl acetate.

Another group of polyol-type materials which can be used as reactants and are favored because of their low cost and commercial availability are the polysaccharides. The polysaccharides can be used in various forms or in the form of their derivatives. These compounds have high molecular weight and are characterized in having a plurality of hydroxyl radicals per macromolecule. More specifically these include: starch, dextrins, dextran and cellulose represented as (CellOH). Of particular significance are the following cellulosic materials: cotton, lenen, wood, paper, regenerated cellulose (as cuprammonium rayon, viscose rayon, and cellulosic film), and hydroxyethylcellulose.

The aryl or substituted aryl haloformates which can be used as starting materials to prepare the polyaryl carbonates of this invention include but are not limited to chloroformates such as phenyl, methylphenyl (tolyl), dimethylphenyl (xylyl), the trimethylphenyls such as 2,4,6 - trimethylphenyl (mesityl), tetramethylphenyl (duryl) and the comparable mono-, di-, tri-, and tetraethyl, propyl and butylphenyls. Another group of compounds less favored as starting materials include the chloroformates of vitrated phenyls, and halogenated phenyls such as mono- and dichloro and bromo-phenyls.

The ratio of the polyol reactant to the aryl haloformate reactant is arranged so that ultimately at least the amount of chloroformate required by stoichiometry is present. Preferably at least a slight excess of chloroformate is utilized, the extent of the excess being primarily limited by economics.

The temperature employed in the reactions can vary between about 10–100° C. depending upon the reactivity of the polyol and haloformate employed and whether atmospheric or super atmospheric pressures are employed.

At substantially atmospheric pressure, temperatures ranging between about 10–75° are more typical.

As indicated above, super atmospheric pressures can be employed if desired. However, since pressurized reactions require more costly equipment and are somewhat more hazardous than reactions run at atmospheric pressures, they are not ordinarily employed.

To facilitate the completion of the reaction between the aliphatic polyols and the aryl chloroformates, it is preferred to utilize a basic solvent which takes up the hydrogen chloride released during the reaction.

Pyridine and its homologues are especially useful for this dual purpose since they combine the required basicity with good polyol solvent power. Pyridine is preferred because of its low cost and availability. However, its homologues and analogues or comparable strength organic bases having the requisite solvent power can be employed. These include alkylated pyridines such as 2-methyl-5-ethylpyridine, quinoline and isoquinoline and their alkylated derivatives.

The reaction time for the preparation varies widely according to the rate at which the reactants are brought together, the reactivity of the reactants, and the temperature and pressure employed. Generally, the reaction is completed within a 6–12-hour period. However, longer reaction times are not harmful.

The polyol reactants employed in this invention are known compounds, in many instances commercially available. The aryl chloroformates such as phenyl and various substituted phenyl chloroformates are also well known compounds which are either commercially available or can be prepared using published procedures.

As stated earlier not only are the novel polyaryl carbonates of this invention intermediates for preparing crosslinking agents, but they themselves can be employed as crosslinking agents for polyimines and polyamines. The reaction below shown a typical crosslinking reaction in generic form:

[—NH(CH₂)ₐNH(CH₂)ᵦ]ₙ     [—NH(CH₂)ₐN(CH₂)ᵦ]ₙ
+                                 O—C=O
R(OCOOA)ₚ  →  R(OCOOA)ₚ₋₂
+                                 O—C=O
[—NH(CH₂)ₐNH(CH₂)ᵦ]ₙ     [—N(CH₂)ₐNH(CH₂)ᵦ]ₙ
                                      + 2HOA wherein $a$, $b$, and $n$, are integers and $p$ is an integer greater than 2.

For carrying out the crosslinking reaction, pyridine is the preferred solvent when a solvent is desired, although crosslinking can be achieved, and quite rapidly at elevated temperatures, without pyridine. Furthermore, certain co-solvents may be used, e.g., N,N-dimethylformamide, 1-methyl-2-pyrrolidone, p-dioxane, phenol, cresols, and xylenols.

Although only 2 of the phenoxycarbonyloxy-type radicals were shown to be involved in the above illustration, more than 2 such radicals often are involved. The following reaction between polymeric 2-methylaziridine and 2-ethyl-2-(hydroxymethyl)-1,3-propanediol tris(phenyl carbonate) shows all of the reactive phenoxycarbonyloxy radicals taking part in the crosslinking:

CH₃
3(—NH—CH—CH₂—)ₙ + CH₃CH₂C(CH₂—O—CO—OC₆H₅)₃ →

CH₃          CH₃
3HOC₆H₅ + (—N—CH—CH₂—)ₙ (—N—CH—CH₂—)ₙ
           CH₂—O—C=O
            |   CH₂—O=C=O         CH₃
            CH₃CH₂C—CH₂—O—C=O    (—N—C—CH₂—)ₙ

The following polyamines or polyimines, wherein $n$ represents the degree of polymerization, are examples of polymers which can be crosslinked by the esters of this invention containing 3 or more aryl carbonate radicals per molecule:

Ethylenimine polymers (—NHCH₂CH₂—)ₙ

2-methylaziridine polymers

CH₃
(—CH—CH—CH₂—)ₙ

N-methylvinylamine polymers $\left( \begin{array}{c} -\text{CH}-\text{CH}_2- \\ | \\ \text{HNCH}_3 \end{array} \right)_n$ One type of polyimine which can be crosslinked with the compounds of this invention is:

(—NH(CH₂)ₐNH(CH₂)ᵦNHG)ₙ wherein $a$, $b$ and $n$ are integers and G is a divalent radical.

To more clearly indicate the compositional aspects of this invention the following illustrative preparations are submitted.

EXAMPLE 1

Synthesis of pentaerythritol tetrakis(phenyl carbonate)

$C(CH_2OCOOC_6H_5)_4$

To 136 grams (1 mole) of pentaerythritol dissolved in 3 liters of pyridine (stirred and kept at 25–30° C. by means of a water bath), is added phenyl chloroformate (628 grams, 4 moles) during a 3-hour period. The mixture is then stirred for an additional 2-hour period at room temperature. The desired product, pentaerythritol tetrakis(phenyl carbonate), is precipitated by the addition of 2 liters of water. The solid product is freed of pyridine by washing with water. The dried precipitate is recrystallized from 2.5 liters of toluene to which 1 liter of ethyl alcohol is added. After desiccation, the white crystals (M.P. 144°–5° C.) weigh 474 grams, a yield of 77% based upon the polyol starting material.

*Analysis.*—Required by $C_{33}H_{28}O_{12}$ (percent): C, 64.28; H, 4.54. Found (percent): C, 64.19; H, 4.39.

EXAMPLE 2

Synthesis of ethyl(hydroxymethyl)propanediol tris (phenyl carbonate)

$(CH_3CH_2C(CH_2OCOOC_6H_5)_3$

To 100 grams (0.75 mole) of 2-ethyl-2-(hydroxymethyl)-1,3-propanediol dissolved in 1 liter of pyridine (stirred, and temperature controlled as in Example 1), is added dropwise phenyl chloroformate (353 grams, 2.25 moles) over a period of 2 hours. The mixture is stirred at room temperature for an additional 2 hours. Then 1 liter of water is added to precipitate the product. After no further precipitation occurs, the solid product is washed free of pyridine by 4 liters of water. Recrystallization is effected by means of 1.5 liters of ethyl alcohol, initially hot. The recrystallized product, 2-ethyl-2-(hydroxymethyl)-1,3-propanediol tris(phenyl carbonate), is washed by cold ethyl alcohol, then by ethyl ether. After desiccation, the crystals (M.P. 104°–6° C.) weigh 285.8 grams, a yield of 77% based upon the starting polyol.

*Analysis.*—Required by $C_{27}H_{26}O_9$ (percent): C, 65.6; H, 5.27. Found (percent): C, 66.7; H, 5.09.

EXAMPLE 3

Synthesis of glycerol tris(phenyl carbonate)

$C_6H_5OCOOCH(CH_2OCOOC_6H_5)_2$

Phenyl chloroformate (705 grams, 4.5 moles) is added dropwise during a 4-hour period to a stirred solution of 138 grams (1.5 moles) of glycerol in 1 liter of pyridine. The temperature is controlled as in Example 1. The reaction mixture is stirred for an additional 2-hour period at room temperature. At this time 2 liters of water is added to separate the product, glycerol tris(phenyl carbonate). After standing overnight, the oil phase of the 2-phase system is separated, dissolved in 2 liters of chloroform, and the chloroform solution extracted six times with 100-ml. portions of water to remove pyridine. The solvent is removed by distillation. The yield of oil is 618 grams (91%) based upon the glycerol starting material.

Analysis.—Required by $C_{24}H_{20}O_9$ (percent): C, 63.7; H, 4.43. Found (percent): C, 62.7; H, 4.46.

EXAMPLE 4

Synthesis of poly(phenyl carbonate) of sorbitol

Phenyl chloroformate (470 grams, 3 moles) is added dropwise over a 1.5-hour period to a stirred solution of 95.5 grams (0.5 mole) of sorbitol in 2 liters of pyridine. The temperature is controlled as in the previous examples. The reaction mixture is stirred for an additional 2-hour period. Next, a 2-liter portion of water is added to the stirred reaction mixture while the stirring is continued. The mixture is allowed to stand while the product settles to the bottom as an oil. The upper (aqueous) phase is decanted off. The oil is dissolved in 500 ml. of chloroform, and the chloroform solution is extracted ten times with 100-ml. portions of water to remove pyridine. The washed and extracted chloroform solution is dried with anhydrous sodium sulfate and filtered. The chloroform is distilled off, leaving a yield of 382 grams of product. In addition to the sorbitol hexakis-(phenyl carbonate), the product also contains sorbitol cyclic carbonate tetrakis(phenyl carbonate). The following grouping is identified by the infrared spectrum:

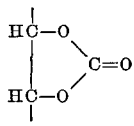

EXAMPLE 5

Synthesis of "Sutro" poly(phenyl carbonate)

To 180 grams (3 equivalents) of Sutro 100 [1] dissolved in 1.5 liters of pyridine (stirred and kept at 25 to 30° C. by a water bath), is added dropwise phenyl chloroformate (516 grams, 3.3 equivalent) over a 2-hour period. The reaction mixture is stirred for an additional 3-hour period at room temperature and the desired poly(phenyl carbonate) precipitated as an oil by the addition of water. The oil is extracted with water to free it of pyridine and other water-soluble compounds, then dissolved in chloroform and dried over anhydrous magnesium sulfate. The chloroform is removed from the product by means of a rotating evaporator. The product weighs 420 grams which is a yield of 78% based upon the polyol starting material.

The product contains not only the open-chain poly-(phenyl carbonate) but also "Sutro" poly(phenyl carbonate) with the following grouping, as shown by the infrared spectrum:

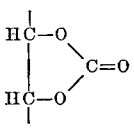

---

[1] Sutro 100 is a product of Atlas Chemical Industries, Inc., consisting essentially of an anhydrous mixture of essentially open-chain polyols, 3 to 6 carbon atoms in length, resulting from the hydrogenolysis of sucrose. Characteristics of Sutro 100 are as follows: molecular weight, 160; equivalent weight, 60; on the average approximately 2.7 hydroxyl radicals per molecule.

EXAMPLE 6

Synthesis of tris(phenyl carbonate) of a partially propoxylated glycerol

The polyhydroxy compound used in this example is a trihydric alcohol made from glycerol by propoxylation so as to give a hydroxyl content of 19.5%. The starting material is a product of Dow Chemical Company, Midland, Mich., and is sold under the name of Voranol CP–260. The propoxylated starting material has a molecular weight of 3(17.0)/0.195 or 262, and is derived by condensing 2.93 moles of propylene oxide with each mole of glycerol.

Phenol chloroformate (360 grams, 2.3 moles) is added dropwise during a 3-hour period to a stirred solution of 200 grams (0.76 mole) of the propoxylated glycerol in 1 liter of pyridine. During the addition, the temperature of the reaction mixture is kept between 20° and 30° C. After the addition is complete, stirring is continued for approximately 16 hours more. At this time water (2 liters) is added to the reaction mixture to precipitate the product as an oil. The oil is dissolved in 1 liter of chloroform, and the chloroform solution extracted by 5 times with 100-ml. portions of water to remove pyridine. The washed and extracted chloroform solution is dried, filtered, and the chloroform distilled off at reduced pressure, to produce a yield of 392 grams of viscous yellow oil. The yield is 34% based upon the propoxylated glycerol starting material.

Analysis.—Required by $C_{32.8}H_{37.6}O_{11.9}$ (percent): C, 63.2; H, 6.0. Found (percent): C, 63.58; H, 5.95.

The infrared spectrum shows that the product is free of hydroxyl groups.

EXAMPLE 7

Crosslinking of polyethylenimine by glycerol tris (phenyl carbonate)

The polyethylenimine used in this example and Examples 8 and 9 is a commercial grade manufactured by the Dow Chemical Company. It is a polymeric mixture said to have an average molecular weight of approximately 1000, and a branched structure in which the ratio of primary to secondary to tertiary nitrogen atoms is approximately 1:2:1. The equivalent weight is taken as 43.07, the molecular weight of the monomer unit

Operating with all ingredients at room temperature, a solution of glycerol tris(phenyl carbonate) and chloroform (2.0 parts by weight of each) is added to a solution of the above-defined polyethylenimine in chloroform (1.0 part by weight of each). The ratio of poly-carbonate to polyimine in parts by weight, namely 2:1, corresponds to a ratio of 0.58:1 by equivalents. (Equivalent weights of reactants are 150.8 and 43.07.)

In one (1) minute the reaction mixture becomes gelled to such an extent by crosslinking that it can no longer be stirred manually. Furthermore, an odor of by-product phenol is evident. The crosslinked product is insoluble in chloroform, pyridine, and water and is infusible. That is, no melting occurs when the cross-linked product is heated as high as 275° C. Gelation, insolubility, and infusibility are properties which are characteristic of crosslinked or 3-dimensional polymers.

The procedure is repeated with similar results by using glycerol tris(phenyl carbonate) and polyethylenimine in the weight ratios of 3.5:1 and 5.0:1 (corresponding to equivalent ratios of 1.00:1 and 1.45:1, respectively). Each time the reactants are first dissolved in an equal weight of chloroform.

EXAMPLE 8

Crosslinking of polyethylenimine by pentaerythritol tetrakis(phenyl carbonate)

While all ingredients are at room temperature, a solution of 2.1 parts of pentaerythritol tetrakis(phenyl carbonate) and 8.4 parts of chloroform is added to a solution of polyethylenimine in chloroform (1.0 part by weight of each). The ratio of polycarbonate to polyimine in parts by weight, viz, 2.1:1, corresponds to a ratio of 0.58:1 by equivalents.

Results are similar to those of Example 7. Furthermore, the procedure is repeated with comparable results using pentaerythritol tetrakis(phenyl carbonate) and polyethylenimine in the weight ratios of 3.6:1 and 5.2:1 (this corresponds to equivalent ratios of 1.00:1 and 1.45:1, respectively).

EXAMPLE 9

Crosslinking of polyethylenimine by sorbitol poly(phenyl carbonate)

While all ingredients are at room temperature, a solution of the product of Example 4, namely, sorbitol poly(phenyl carbonate) and chloroform (2 parts by weight of each) is added to a solution of polyethylenimine in chloroform (1 part by weight of each). The ratio of polycarbonate to polyimine in parts by weight, viz, 2:1, corresponds to a ratio of approximately 0.58:1 by equivalents.

Results resemble those of Example 8. Furthermore, the procedure is repeated with similar results using poly(phenyl carbonate) of sorbitol and polyethylenimine in the weight ratios of 3.5:1 and 5.0:1 (corresponding to equivalent ratios of 1.00:1 and 1.45:1 respectively).

EXAMPLE 10

Crosslinking of tetraethylenepentamine by glycerol tris(phenyl carbonate) at room temperature In this example and Examples 11 to 15 inclusive, the crosslinking is done using tetraethylenepentamine

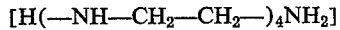

as the polyamine. This compound has an equivalent weight (with respect to nitrogen) of 37.8, i.e., one-fifth of the formula weight of 189.3.

With all ingredients at room temperature, a solution of glycerol tris(phenyl carbonate) and chloroform (2.3 parts by weight of each) is added to a solution of tetraethylenepentamine in chloroform (1.0 part by weight of each). The ratio of polycarbonate to tetraethylenepentamine in parts by weight, namely 2.3:1 corresponds to a ratio of 0.58:1 by equivalents.

In approximately 10 minutes the reaction mixture becomes an elastic mass in which the odor of phenol develops. The gelled product is shown to be crosslinked by subjecting it to the tests described within Example 7, i.e., insolubility and infusibility are used to establish that the product is crosslinked.

The procedure is repeated by using weight ratios of 3.9:1 and 5.7:1 (corresponding to equivalent ratios of 1.00:1 and 1.45:1, respectively). Longer gelation times are observed, viz, approximately 30 minutes and approximately 45 minutes, respectively. Otherwise the results are similar, i.e., insoluble, infusible products are obtained, and phenol is the by-product.

EXAMPLE 11

Crosslinking of tetraethylenepentamine by glycerol tris(phenyl carbonate) at 140° to 145° C.

The ingredients of Example 10 are used, in the equivalent ratio of 0.58:1, but 140° to 145° C. is used instead of room temperature. The reaction mixture becomes an elastic mass in 5 to 10 minutes. Apart from the by-product phenol, the material is insoluble and infusible, hence crosslinked.

The procedure is repeated at 140° to 145° C. using the higher ratios of carbonate to tetraethylenepentamine. A gelation time of approximately 30 minutes is observed for the 1.00:1 equivalent ratio and a less-sharp gelation time of 45±15 minutes is observed for the 1.45:1 equivalent ratio.

EXAMPLE 12

Crosslinking of tetraethylenepentamine by pentaerythritol tetrakis(phenyl carbonate) at room temperature With all ingredients at room temperature, a solution of 2.5 parts pentaerythritol tetrakis(phenyl carbonate) and 10.0 parts of chloroform is added to a solution of tetraethylenepentamine in chloroform (1.0 part by weight of each). This corresponds to a ratio of 0.58:1 by equivalents.

In 3 to 5 minutes the reaction mixture becomes an elastic mass from which the odor of phenol develops. The gelled product is shown to be crosslinked by subjecting it to the solubility and fusibility tests described in Example 7.

The procedure is repeated using weight ratios of 4.3:1 and 6.3:1 (corresponding to equivalent ratios of 1.00:1 and 1.45:1, respectively). Results are similar in all respects, including gelation times of 3 to 5 minutes.

EXAMPLE 13

Crosslinking of tetraethylenepentamine by pentaerythritol tetrakis(phenyl carbonate) at 140° to 145° C.

The ingredients of Example 12 are used, and in the equivalent ratio of 0.58:1, but 140° to 145° C. is used instead of room temperature. The reaction mixture becomes an elastic mass in 5 to 10 minutes. Except for by-product phenol, the material is insoluble and infusible, —obviously crosslinked.

The procedure is repeated at 140° to 145° C. using the higher ratios. A gelation time of 45±15 minutes is observed for both ratios, viz, 1.00:1 and 1.45:1.

EXAMPLE 14

Crosslinking of tetraethylenepentamine by sorbitol poly(phenyl carbonate) at room temperature With all ingredients at room temperature, a solution of the product of Example 4, namely, sorbitol poly(phenyl carbonate) and chloroform (2.3 parts by weight of each) is added to a solution of tetraethylenepentamine in chloroform (1.0 part by weight of each). This corresponds to a ratio of 0.58:1 by equivalents.

Results are similar to those of Example 13, even to those obtained by repeating the procedure at the higher equivalent ratios of 1.00:1 and 1.45:1.

EXAMPLE 15

Crosslinking of tetraethylenepentamine by sorbitol poly(phenyl carbonate) at 140° to 145° C.

The ingredients of Example 14 are used, and in the equivalent ratio of 0.58:1, but a temperature range of 140° to 145° C., is used instead of room temperature. The results resemble those of Example 14, even to those obtained by repeating the procedure at the higher equivalent ratios of 1.00:1 and 1.45:1.

This invention is advantageous in both its compositional and process aspects.

For example, the novel compositions of this invention represent the first preparation of polyaryl carbonates. In addition, the polyfunctional products are valuable crosslinking agents for polyimines and polyamines.

A particularly valuable advantage that the novel aliphatic polyaryl carbonates of this invention possess is their singular value as intermediates for preparing textile crosslinking agents. For example, prior to this invention, attempts to prepare polycarbamates substantially free from contaminants starting with polyols were unsuccessful. Poor yields, competing side reactions to produce an intractable mixture of products, including contaminants, made the prior art processes unworkable. In contrast, when the polyaryl carbonates of this invention, which are derived from the same polyols, are used as reactants, the reaction is successful and clean-cut. Further, the reaction proceeds under mild conditions, yields are excellent and contamination is not a serious problem.

In its process aspects this invention employs relatively inexpensive and readily available starting materials, reaction conditions are mild and the products are generally obtained in good yield, substantially free from contaminants. In addition, the reaction products can be readily purified, separated from any contaminants, using conventional procedures to obtain the products in the highly purified state.

As indicated by the illustrated examples and embodiments, numerous changes, substitutions and modifications can be made in reactants, reaction conditions and the like without departing from the inventive concept. The metes and bounds of the invention can best be seen from the claims which follow:

What is claimed is:
1. $CH_3CH_2C(CH_2OCOOC_6H_5)_3$.

References Cited
UNITED STATES PATENTS

| 3,275,674 | 9/1966 | Bottenbruch et al. | 260—463 |
| 2,370,571 | 2/1945 | Muskat et al. | 260—463 |
| 2,384,115 | 9/1945 | Muskat et al. | 260—463 X |
| 2,873,291 | 2/1959 | Spiegler | 260—463 |
| 3,415,844 | 12/1968 | Kulka | 260—463 X |

LEON ZITVER, Primary Examiner

L. DE CRESCENTE, Assistant Examiner

U.S. Cl. X.R.

117—139.4; 260—77.5

PO-1050
(5/69)

UNITED STATES PATENT OFFICE
CERTIFICATE OF CORRECTION

Patent No. 3,542,841                    Dated November 24, 1970

Inventor(s) Giuliana C. Tesoro and Donald R. Moore

It is certified that error appears in the above-identified patent and that said Letters Patent are hereby corrected as shown below:

Column 1, line 32, "or" second occurrence should read -- of
Column 4, lines 17-19 "1,2,3,4,5,6,7-heptaneheptols $C_7H_{16}O_7$ such as perseitol and arabinol, galactitol, glucitol (sorbito iditol, mannitol, and ribitol." should read -- 1,2,3,4,5,6-hexanehexols $C_6H_{14}O_6$; such as allitol, altritol, arabinol, galactitol, glucitol (sorbitol), iditol, mannitol, and ribito
Column 4, line 51, "lenen" should read -- linen --;
Column 4, line 64, "vitrated" should read -- nitrated --;
"balogenated" should read --halogenated --; Column 5, line "shown" should read -- shows --; Column 6, lines 7 and 8

"   $\overset{CH_3}{(-CH-CH-CH_2)_n}$   " should read --   $\overset{CH_3}{(-NH-CH-CH_2-)_n}$   --.

Column 6, line 45  "$(CH_3CH_2C(CH_2OCOOC_6H_5)_3$" should read

-- $CH_3CH_2C(CH_2OCOOC_6H_5)_3$ -- .

Signed and sealed this 17th day of October 1972.

(SEAL)
Attest:

EDWARD M. FLETCHER, JR.
Attesting Officer

ROBERT GOTTSCHALK
Commissioner of Patents